Oct. 20, 1936.  R. B. HAYWARD  2,058,151
REEL
Filed Aug. 19, 1933   5 Sheets-Sheet 1
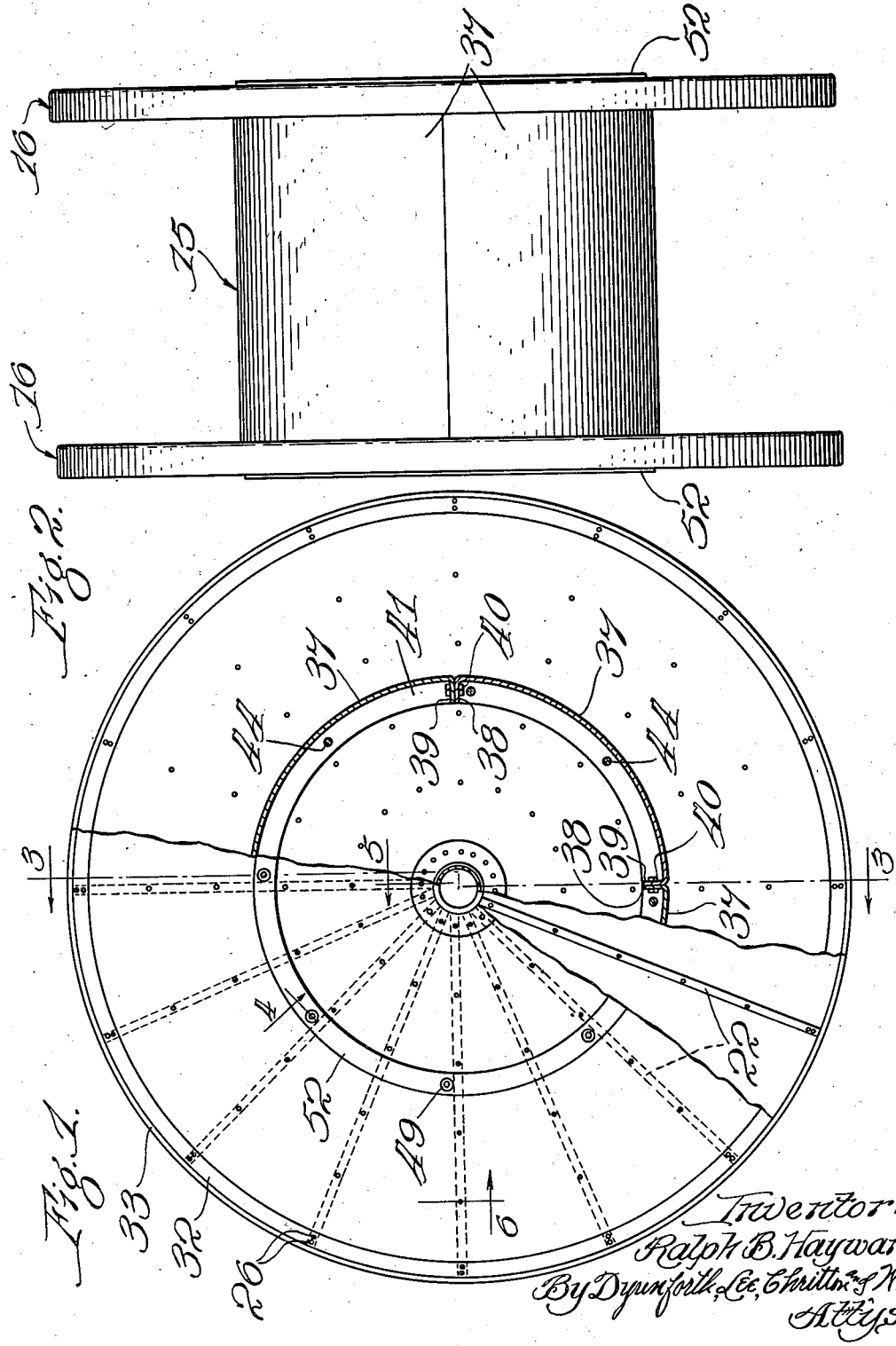

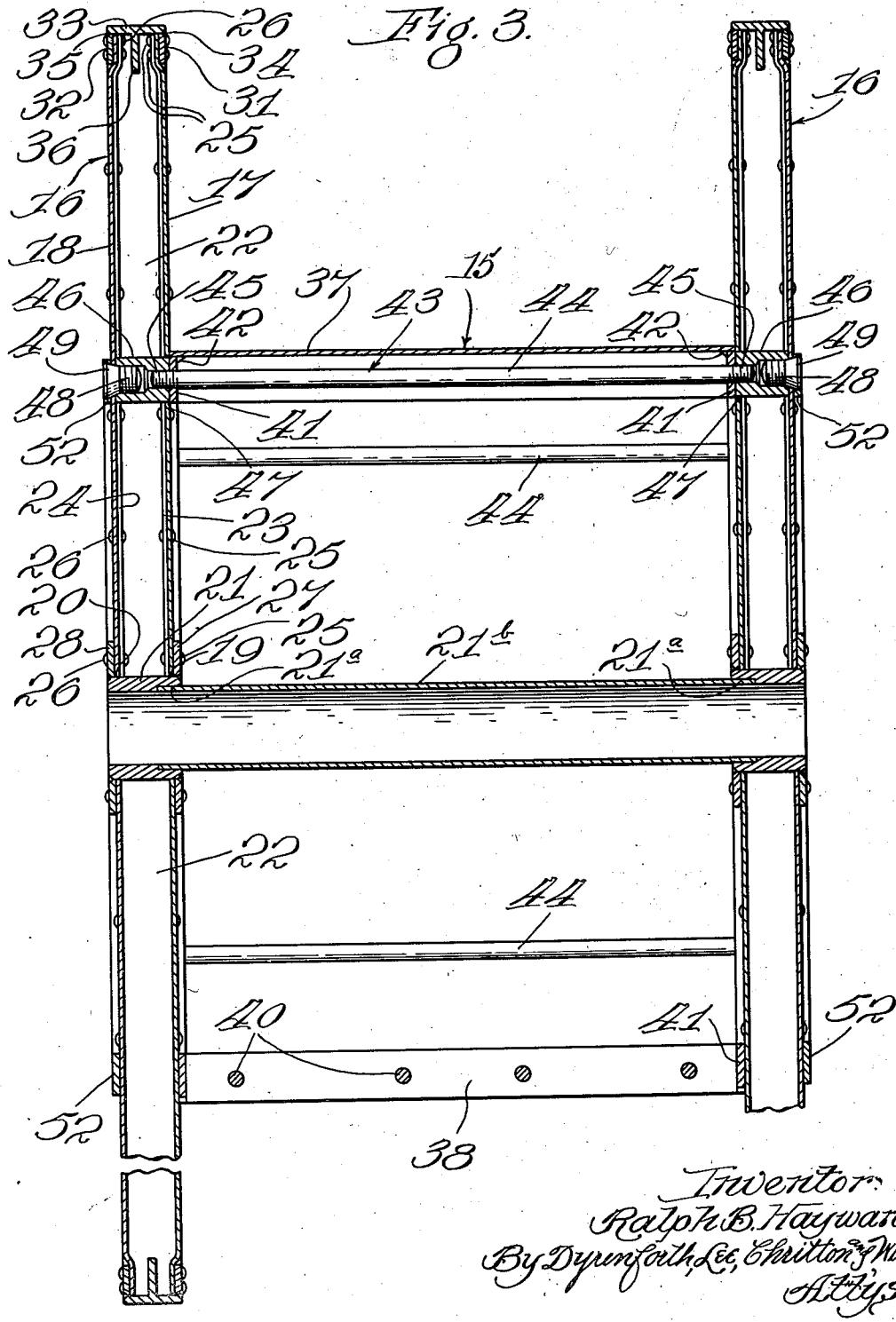

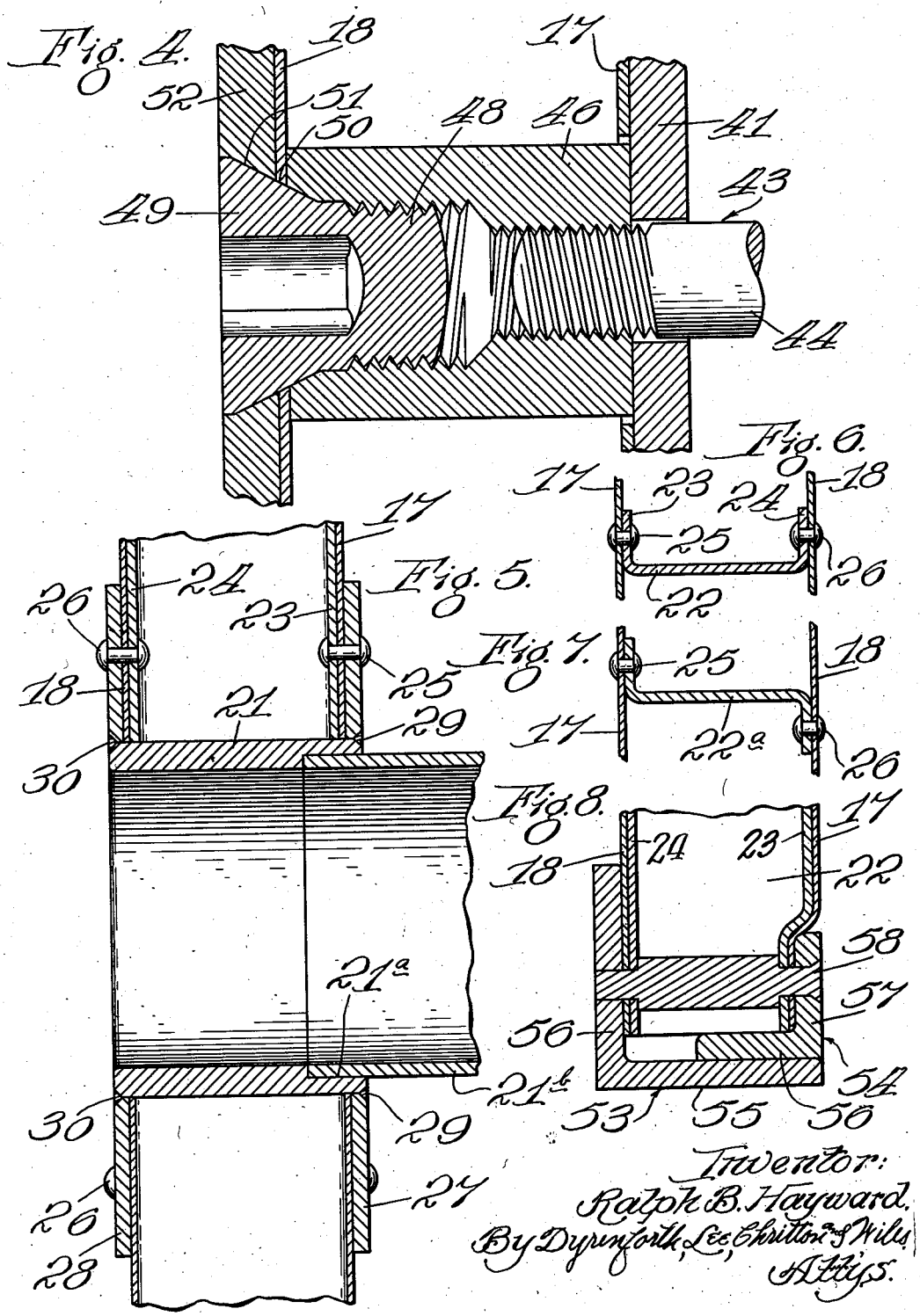

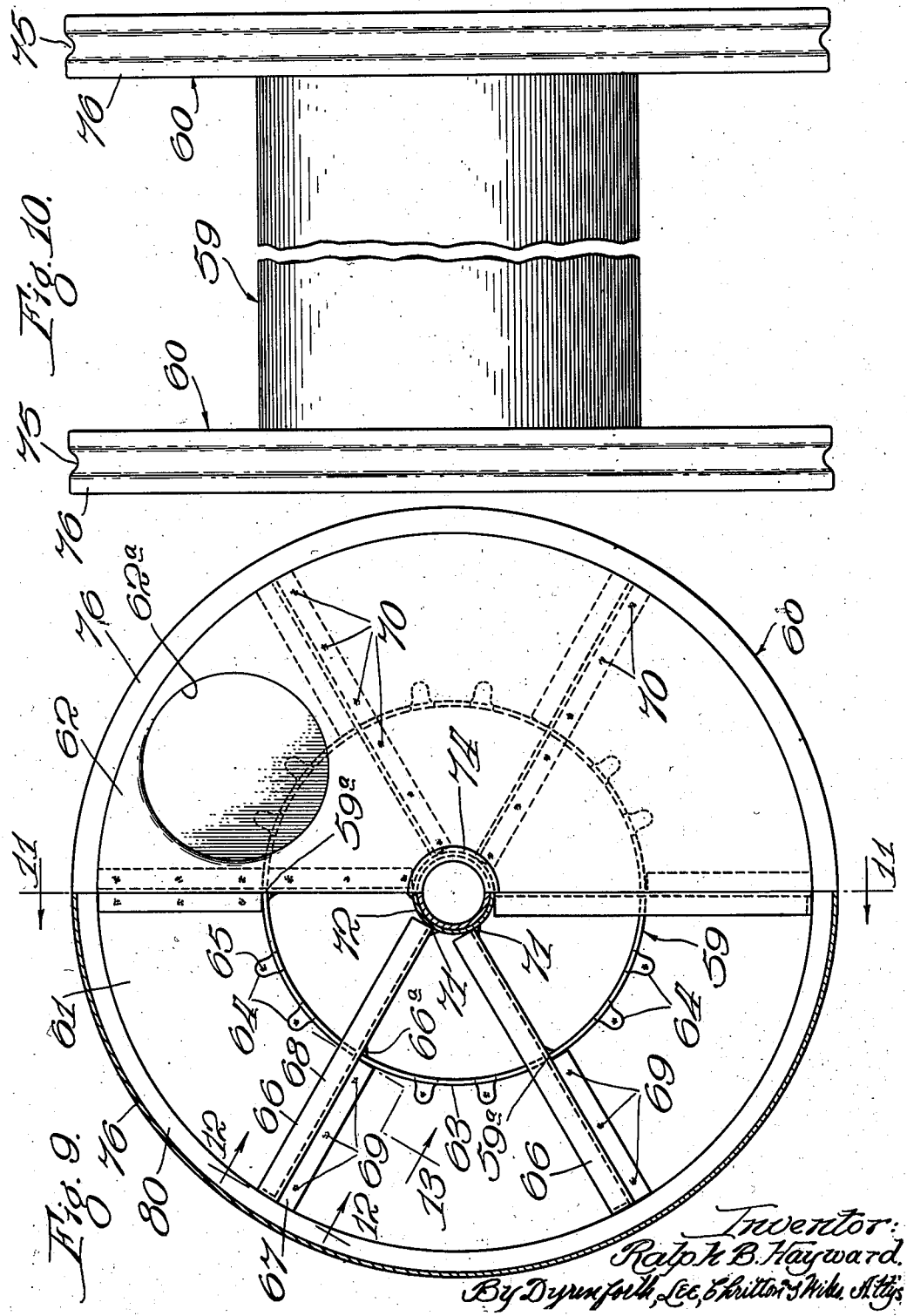

Oct. 20, 1936.   R. B. HAYWARD   2,058,151
REEL
Filed Aug. 19, 1933   5 Sheets—Sheet 5
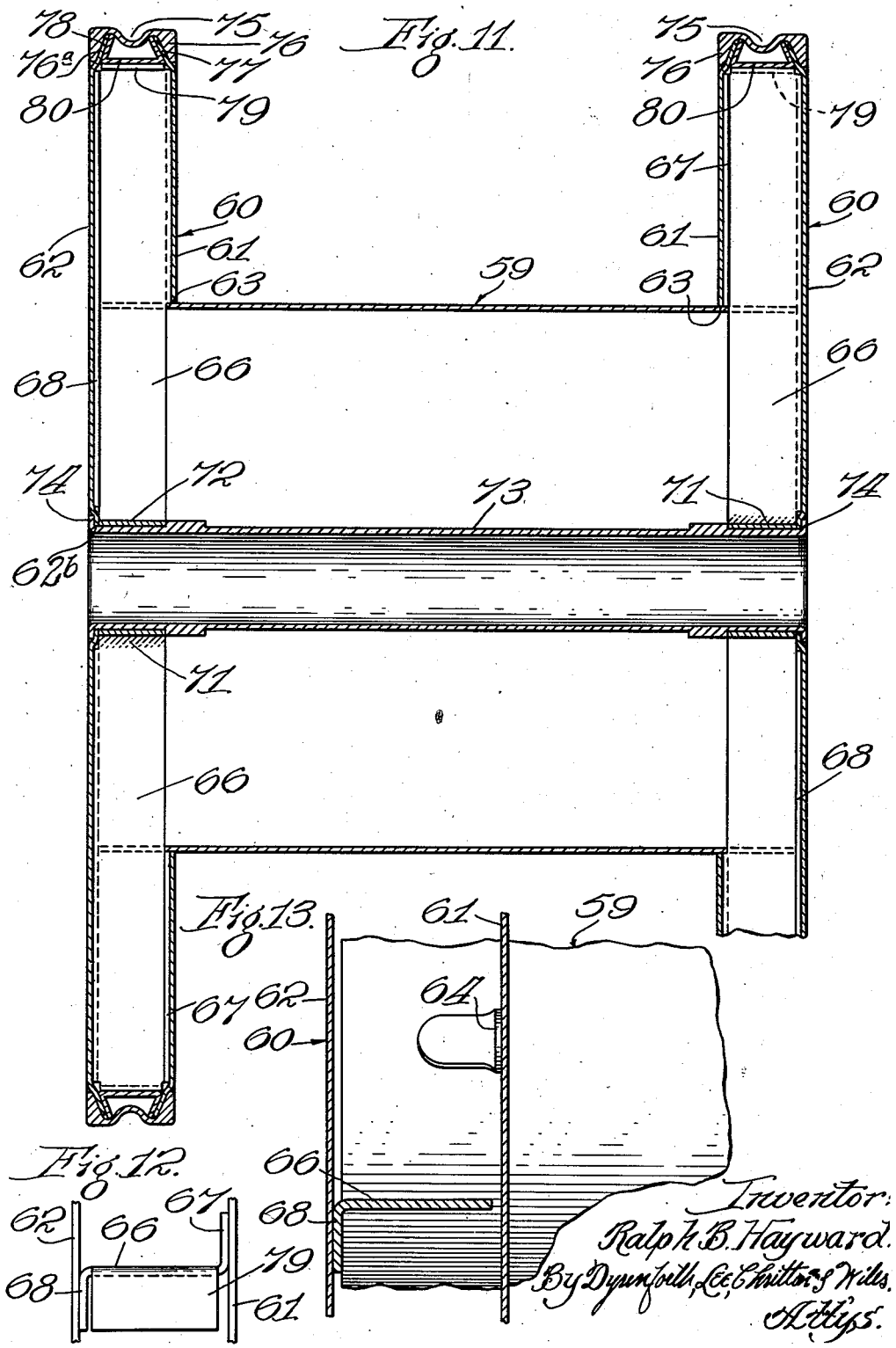

Patented Oct. 20, 1936

2,058,151

UNITED STATES PATENT OFFICE 2,058,151

REEL

Ralph B. Hayward, La Grange, Ill.

Application August 19, 1933, Serial No. 685,945

15 Claims. (Cl. 242—77)

My invention relates to improvements in reels provided for the winding thereon of electric cables, wire, or the like.

Certain of my objects are to provide a construction of reel the heads of which, while presenting the desired strength, stiffness and durability may be manufactured of relatively light gage sheet metal to the end of reducing the cost thereof and rendering the heads of lighter weight; to provide a construction of reel having the characteristics above referred to which may be made of galvanized metal; to provide improvements in the treads of the heads; to provide novel means for connecting the heads with the drum portion of the reel; to provide, particularly in a reel of relatively small size and for receiving a light load of wire, for an inexpensive metal drum and head assembly which will be of light weight and present the desired strength, durability and rigidity; and other objects as will be manifest from the following description.

Referring to the accompanying drawings:

Figure 1 is an end view of a reel embodying my invention, portions of the structure being broken away to disclose details.

Figure 2 is a side view of the reel.

Figure 3 is an enlarged broken sectional view of the reel, the section being taken at the line 3—3 on Fig. 1 and viewed in the direction of the arrows.

Figure 4 is an enlarged fragmentary sectional view taken at the line 4 on Fig. 1 and viewed in the direction of the arrow showing one of the similar tie-rod devices for securing together the heads and the drum of the reel.

Figure 5 is an enlarged fragmentary sectional view taken at the line 5 on Fig. 1 and viewed in the direction of the arrow.

Figure 6 is an enlarged fragmentary sectional view taken at the line 6 on Fig. 1 and viewed in the direction of the arrow.

Figure 7 is a view like Fig. 6 showing a modified form of a spoke-construction of the head.

Figure 8 is a fragmentary sectional view of a modification of the tread portion of the head.

Figure 9 is a face view, partly sectional, of another form of reel structure embodying certain features of my invetnion.

Figure 10 is a side view of the reel of Fig. 9.

Figure 11 is a section taken at the line 11—11 on Fig. 9 and viewed in the direction of the arrow, a portion of the reel-head being shown broken away.

Figure 12 is a fragmentary sectional view of the reel, the section being taken at the line 12—12 on Fig. 9 and viewed in the direction of the arrows; and Figure 13, a similar view, the section being taken at the irregular line 13 on Fig. 9 and viewed in the direction of the arrow.

Referring to the particular construction illustrated in Figs. 1 to 6, inclusive, and designed more particularly for heavy loads of cable, wire, or the like, the reel as shown comprises a hub, or drum, portion represented generally at 15 and sheet metal heads, represented generally at 16, positioned at the ends of the drum 15 and secured thereto as hereinafter described.

Each head 16 comprises spaced apart sheet metal disklike members 17 and 18 centrally apertured as represented at 19 and 20, respectively, to receive an arbor tube 21 secured in place therein as hereinafter described and having a counterbored opening 21$^a$ in its inner end in which the adjacent end of a tube 21$^b$ extending from one to the other of the arbor tubes of the two heads 16, closely fits.

Between the disklike members 17 and 18 are flanged reinforcing rib-forming members 22 which radiate from the center of the head and form spokes, these spoke-forming members, shown in this particular construction as of channel form but which may be provided of other forms if desired, being secured at their flange portions 23 and 24 to the disklike members 17 and 18, respectively, in any suitable way, as for example by rivets represented at 25 and 26.

Surrounding the ends of the arbor tube 21 and positioned against the outer surfaces of the disk members 17 and 18 at the central openings in the latter, are rings 27 and 28 shown as held to the above described disk and spoke assembly by certain of the rivets 25 and 26 as illustrated, particularly in Fig. 5, and secured to the arbor tube 21, as for example by annularly welding them thereto as represented at 29 and 30.

Each head 16 is provided with a reinforced peripheral tread portion shown as comprising a pair of rings 31 and 32 applied to the outer faces of the disk members 17 and 18, respectively, at their peripheral margins which are preferably deflected inwardly as shown in Fig. 3 a distance substantially equal to the thickness of the rings 31 and 32, these rings being held in place in any suitable way, as for example by certain of the rivets 25 and 26, as shown. The tread portion further comprises a ring 33 at the periphery of the head 16 secured to the rings 31 and 32, for example as by annularly welding these parts together at the joints indicated at 34 and 35, the inner periphery of the ring 33 being provided with an annular inwardly extending flange 36 forming a stiffening rib for the ring, and the outer ends of the spoke-forming ribs 22 being recessed to receive the flange 36.

The hub, or drum, portion 15 of the reel comprises a sheet metal cylindrical member, or drum, shown as formed of four quarter sections 37 the opposite longitudinal edges of each of which are provided with inwardly extending rib-forming flanges 38 and 39 shown as extending a slight distance short of opposite ends of the sections 37, adjacent ones of these flanges being flatwise opposed and radiating from the center of the drum as shown in Fig. 1 in which position they are connected together, as for example by the bolts represented at 40.

The hub, or drum portion, 15 of the reel also comprises rings 41 which are located in the ends of the drum shell 15 and flatwise oppose the ends of the flanges 38 and 39, these rings which are shown as welded to the arcuate portions of the sections 37 and to the flanges 38 and 39 as represented at 42, serving as means for circumferentially reinforcing the drum 15 against compression stresses.

The means shown for securing together the drum 15, the heads 16 and the tube 21$^b$ comprise an annular series of tie-rod devices represented generally at 43 and extending from one head 16 to the other thereof in a direction longitudinally of the axis of the reel. Each tie rod device 43 is shown as comprising a rod proper 44 extending at its opposite ends through holes in the rings 41 and threaded as represented at 45 at which threaded portions it screws into nuts 46 which are located in openings 47 in the disk members 17 of the heads and abut at their outer ends against the inner faces of the disk-like members 18 of these heads, the nuts 46 being screwed onto the rods 44 into such position that they firmly clamp the drum structure 15 between them by engaging with the rings 41.

The tie-rod devices 43 also comprise plow screws represented at 48 which screw into the outer ends of the nuts 46, these screws, having outwardly flaring heads 49 shown as having wedging engagement with the walls of openings 50 in the disk member 18 through which these screws extend and also wedging engagement with countersunk openings 51 in rings 52 fitting flatwise against the outer surfaces of the disk members 18 concentrically with the central axis of the heads 16 and in effect forming parts of these heads.

In the assembling of the parts of the reel the rods 44 are first assembled with the drum shell structure to the position shown and the nuts 46 then applied to the ends of the rods and screwed up tightly against the rings 41. The heads 16 are then applied to the ends of the drum 15 and the tube 21$^b$ to the arbor tubes 21$^a$, the nuts 46 becoming positioned in these heads as shown in the drawing. The screws 48 are then screwed into the ends of the nuts 46 for tightly clamping the heads at their disk members 18 and 17, respectively, against the outer ends of the nuts 46 and against the ends of the drum shell 15.

A modification of the spoke-forming elements of the head 16 is shown in Fig. 7; the spoke, in this construction and represented at 22$^a$, being of Z-shape in cross section and attached at its flanges to the disks 17 and 18 in any suitable way, as for example by the rivets 25 and 26.

Fig. 8 shows a modification of the tread portion of the head which, in this construction comprises two rings 53 and 54 of angle shape in cross section telescoped at their flanges 55 and 56 which are preferably welded together at intervals about the periphery of the tread.

The disklike members 17 and 18 of the head together with the outer ends of the spokes, shown in this modification as of the channel type illustrated in Fig. 6, extend into the inwardly opening annular channel provided by the tread sections 53 and 54, wherein they are secured as by spacer-rivets, one of which is shown at 58, provided in an annular series and extending through the annular flange portions 56 and 57 of the rings 53 and 54, the disk members 17 and 18 and the flanges 23 and 24 of the spokes.

Referring to the construction of reel illustrated in Figs. 9 to 13, inclusive, and of a design particularly adapted for small reels carrying relatively light loads, the reel as shown comprises a sheet metal hub, or drum portion 59 and heads 60 secured thereto as hereinafter described.

Each head 60 comprises spaced apart disklike sheet-metal members 61 and 62, the disk 61 being centrally apertured as represented at 63 and the disk 62, which is shown as containing a depression 62$^a$ for a label, centrally apertured as represented at 62$^b$, the ends of the drum 59 extending through the apertures 63 in the members 61 and into the heads to a position in which they abut the members 62, as shown, and connected with the members 61 by tongues 64 cut from the metal of the drum and bent to lie flatwise against the members 61 at the interior of the heads to which they are spot welded as represented at 65.

Each head 60 also comprises a series of radially extending spoke-forming members 66 located between the disklike members 61 and 62 and shown as of Z-shape in cross section presenting oppositely extending flanges 67 and 68 which flatwise oppose the inner faces of the disk members 61 and 62, respectively, to which they are secured in any desirable way, as for example by welding them thereto as represented at 69 and 70, respectively, the flanges 68 extending substantially the full length of the members 66 and the flanges 67 extending from the outer ends of the members 66 to a point adjacent the drum 59. The members 66 extend through slots 59$^a$ in the drum 59 opening through the ends of the latter and are connected at their inner ends, as for example by welds represented at 71 to a collar 72, and between their ends to the drum 59 as by the welds represented at 66$^a$, the collars 72 of the two heads, in the assembling of the parts of the reel, fitting over the reduced ends of an arbor tube 73 the extremities of which are swaged to overlie the outer surfaces of the heads 60 as represented at 74 and rigidly hold the latter in assembled relation with the tube 73.

Each head 60 is also provided with a tread portion presenting a continuous groove 75 about its periphery for engagement with a belt (not shown) by which the reel may be rotated if desired. The tread portion referred to is shown as formed of a ring 76 split crosswise and of general channel shape in cross section with its channel 76$^a$ opening inwardly and its side walls being relatively thick as shown to render it highly durable.

The peripheral margins of the disk members 61 and 62 are inwardly deflected as represented at 77 and 78 at which portions they extend into the channel 76$^a$ the walls of which preferably flare toward the central axis of the reel, as shown.

The outer ends of the webs of the spokes 66 are bent at right angles to form flanges 79 between which and the inwardly deflected portions 77 and 78 of the disk members 61 and 62 and the grooved portion of the ring 76, a channel ring 80, with its channel opening outwardly, is located to reinforce the tread portions of the head, the flanges 79 being welded to the web or base portion of the channel ring 80 and the flanges of this ring welded to the deflected portions 77 and 78 of the members 61 and 62. The ends of the split ring 76, after assembly with the other parts of the head, are secured together in any suitable way as for example by welding them together.

While I have illustrated and described certain embodiments of my invention I do not wish to be understood as intending to limit it thereto as the same may be variously modified and altered and the invention embodied in other forms of structure, without departing from the spirit thereof.

What I claim as new, and desire to secure by Letters Patent, is:

1. A head construction comprising spaced apart disk-like members and spokes formed separate from, and interposed between, said members, said spokes being of single-web form disposed edgewise relative to said members with flanges at their opposite edges opposing said members.

2. A head construction comprising spaced apart disk-like members and spokes formed separate from, and interposed between, said members, said spokes being of channel form in cross section and at their flanges opposing said members.

3. A head construction comprising spaced apart disk-like members and spokes formed separate from, and interposed between, said members, said spokes being of general Z-shape in cross section and at their flanges opposing said members.

4. A reel comprising a drum portion and heads secured thereto, said heads comprising disk-like members and radiating ribs extending along faces of said members, said drum extending outwardly beyond portions of said ribs and said ribs extending transversely through said drum portion.

5. A reel comprising a drum portion and heads secured thereto, said heads comprising disk-like members and spokes extending along faces of said members, said drum extending outwardly beyond portions of said ribs and said spokes having flanges secured to said members and extending transversely through said drum portion.

6. A reel comprising a drum portion and heads secured thereto, said heads comprising disk-like members and spokes extending along faces of said members, said drum extending outwardly beyond portions of said ribs and said spokes having flanges opposing said members and extending transversely through said drum portion and extending from said drum portion both inwardly and outwardly.

7. A reel comprising a drum portion and heads secured thereto, each of said heads comprising spaced apart disk-like members and radiating ribs between said members, said drum extending outwardly beyond the inner ones of said members and said ribs extending transversely through said drum portion.

8. A reel comprising a drum portion and heads secured thereto, each of said heads comprising spaced apart disk-like members and spokes between said members, said drum extending outwardly beyond the inner ones of said members and said spokes extending transversely through said drum portion.

9. A reel comprising a drum portion and heads secured thereto, each of said heads comprising spaced apart disk-like members and spokes between said members having inner and outer flanges at their edges opposing said members, said drum portion extending at its ends into said heads and slotted to receive said spokes, the inner flanges of said spokes extending from said drum portion outwardly.

10. A head comprising spaced apart disk-like members, a tread-forming channel member into which the peripheries of said disk-like members extend and a second channel member with its channel opening radially outwardly extending at its flanges into the channel in said first-named channel member.

11. A head comprising spaced apart disk-like members, spokes between said members and having crosswise extending flanges at their outer ends, a tread-forming channel member into which the peripheries of said disk-like members extend and a second channel member with its channel opening radially outwardly extending at its flanges into the channel in said first-named channel member, the peripheral portions of said disk-like members being interposed between the flanges of said channel members and the flanges on said spokes being secured to said second channel member.

12. A head construction comprising spaced apart disk-like members and spokes formed separate from, and interposed between, said members, said spokes being of single-web form disposed edgewise relative to said members with flanges at their opposite edges flatwise opposing said members.

13. A head construction comprising spaced apart disk-like members and spokes formed separate from, and interposed between, said members, said spokes being of channel form in cross section disposed edgewise relative to said members and at their flanges flatwise opposing said members.

14. A head construction comprising spaced apart disk-like members and spokes formed separate from, and interposed between, said members, said spokes being of general Z-shape in cross section and at their flanges flatwise opposing said members.

15. A head portion comprising radiating spokes, a separate disc-like, side-forming member and a tread portion, said spokes having crosswise extending flanges at their outer ends, and said tread portion flatwise opposing, and secured to, said flanges.

RALPH B. HAYWARD.